United States Patent
Lee et al.

(10) Patent No.: US 12,384,422 B2
(45) Date of Patent: Aug. 12, 2025

(54) AUTONOMOUS DRIVING CONTROL APPARATUS AND METHOD THEREOF

(71) Applicants: HYUNDAI MOTOR COMPANY, Seoul (KR); KIA CORPORATION, Seoul (KR)

(72) Inventors: Seung Yong Lee, Uiwang-si (KR); Yun Sub Kim, Suwon-si (KR); Ga Hee Kim, Seoul (KR); Hwan Hee Lee, Gunpo-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 88 days.

(21) Appl. No.: 18/375,865

(22) Filed: Oct. 2, 2023

(65) Prior Publication Data
US 2024/0308549 A1     Sep. 19, 2024

(30) Foreign Application Priority Data
Mar. 15, 2023  (KR) .......................... 10-2023-0033702

(51) Int. Cl.
*B60W 60/00* (2020.01)
*G06V 20/58* (2022.01)
*B60W 40/02* (2006.01)

(52) U.S. Cl.
CPC ....... *B60W 60/00256* (2020.02); *G06V 20/58* (2022.01); *B60W 40/02* (2013.01);
(Continued)

(58) Field of Classification Search
CPC ..... B60W 60/00256; B60W 2420/403; B60W 2556/50; B60W 2420/40; B60W 2556/45;
(Continued)

(56) References Cited

U.S. PATENT DOCUMENTS

2018/0311820 A1* 11/2018 Fritz ................... G05D 1/0282
2022/0066456 A1* 3/2022 Ebrahimi Afrouzi ........................
                                                  G06F 3/04883
(Continued)

FOREIGN PATENT DOCUMENTS

| JP | 2020004316 A | 1/2020 |
|----|--------------|--------|
| JP | 2022047000 A | 3/2022 |
| KR | 20180031114 A | 3/2018 |

*Primary Examiner* — Jelani A Smith
*Assistant Examiner* — Dana D Ivey
(74) *Attorney, Agent, or Firm* — Lempia Summerfield Katz LLC

(57) ABSTRACT

An autonomous driving control apparatus includes a sensor device, a communication device, a memory storing instructions, and a controller. The autonomous driving control apparatus receives a control signal including user vehicle information from a server using the communication device; controls a mobility device to a specified place based on the control signal; obtains at least one piece of image data about at least one vehicle in the specified place using the sensor device; detects at least one of 2D data, 3D data, or a combination thereof for each of the at least one vehicle based on the at least one piece of image data; and searches for a user vehicle among the at least one vehicle based on at least one of the at least one piece of image data, the 2D data, the 3D data, the user vehicle information, or a combination thereof.

20 Claims, 9 Drawing Sheets

(52) U.S. Cl.
CPC ..... *B60W 60/0025* (2020.02); *B60W 60/0027* (2020.02); *B60W 2420/40* (2013.01); *B60W 2420/403* (2013.01); *B60W 2520/14* (2013.01); *B60W 2520/16* (2013.01); *B60W 2520/18* (2013.01); *B60W 2556/45* (2020.02); *B60W 2556/50* (2020.02); *B60W 2556/65* (2020.02); *G06V 2201/08* (2022.01)

(58) Field of Classification Search
CPC ............. B60W 60/0027; B60W 40/02; B60W 60/0025; B60W 2520/14; B60W 2520/16; B60W 2520/18; B60W 2556/65; G06V 20/58; G06V 2201/08
USPC .......................................................... 701/28
See application file for complete search history.

(56) References Cited

U.S. PATENT DOCUMENTS

| | | | |
|---|---|---|---|
| 2022/0083963 A1 | 3/2022 | Tanaka | |
| 2022/0156505 A1* | 5/2022 | Yan | G06V 10/22 |
| 2022/0230443 A1* | 7/2022 | Hua | G06V 10/761 |
| 2023/0172457 A1* | 6/2023 | Liu | G06T 7/60 |
| | | | 600/549 |

* cited by examiner

AUTONOMOUS DRIVING CONTROL APPARATUS AND METHOD THEREOF

CROSS-REFERENCE TO RELATED APPLICATION

This application claims the benefit of priority to Korean Patent Application No. 10-2023-0033702, filed in the Korean Intellectual Property Office on Mar. 15, 2023, the entire contents of which are incorporated herein by reference.

TECHNICAL FIELD

The present disclosure relates to an autonomous driving control apparatus and a method thereof. More particularly, the present disclosure relates to technologies of performing cross-checking by a detection result of at least one vehicle to determine whether a sensor device normally operates, when a host vehicle detects a detection vehicle meeting a specified condition, or to re-identify whether there is the detection vehicle by a response of a user.

BACKGROUND

Various technologies relating to a driving device or a mobility device have been developed. For example, as more pieces of data are used to control driving of the mobility or driving device to a destination, various methods for processing the data have been developed.

The driving device or mobility device may be implemented as one of various types. For example, various driving devices or mobility devices, such as an autonomous vehicle, a mobile robot, and an unmanned aerial vehicle may be implemented such that drivers remotely perform driving control without directly controlling driving.

Particularly, a mobile robot may be used for various purposes in various environments. For example, the mobile robot may move to a specific place (e.g., a parking lot) to deliver a product. When the mobile robot has the product to move to the specific place, a user that requested deliver of the product may receive the product based on various authentication mechanisms.

However, when autonomous driving for the mobile robot is performed, it is difficult to identify an accurate location of a target place to which the product should be delivered. For example, it is rather difficult to identify accurate location information or the like of a target vehicle in a process of identifying an accurate location of the target vehicle corresponding to a user that requests delivery of a product, among various vehicles and in a process of moving the mobile robot to be adjacent to the target vehicle.

SUMMARY

The present disclosure has been made to solve the above-mentioned problems occurring in the prior art while advantages achieved by the prior art are maintained intact.

An aspect of the present disclosure provides an autonomous driving control apparatus for controlling a mobile device (e.g., a mobile robot) to move to a specified place based on a control signal including a target vehicle (e.g., a user vehicle that requests delivery of a product), when receiving the control signal from a server. The autonomous driving control apparatus is also for identifying an accurate location of the target vehicle using image data about vehicles in the specified place using at least one sensor. Another aspect of the present disclosure provides a method thereof.

Another aspect of the present disclosure provides an autonomous driving control apparatus for detecting at least one of 2D data, 3D data, or a combination thereof for each of multiple vehicles in a specified place, using at least one sensor. The autonomous driving control apparatus is also for searching for a target vehicle based on at least a portion of the detected result. Another aspect of the present disclosure provides a method thereof.

Another aspect of the present disclosure provides an autonomous driving control apparatus for more accurately identifying a target vehicle using image data obtained using at least one of a red-green-blue (RGB) camera, an infra-red (IR) camera, or a combination thereof. Another aspect of the present disclosure provides a method thereof.

The technical problems to be solved by the present disclosure are not limited to the aforementioned problems. Any other technical problems not mentioned herein should be clearly understood from the following description by those having ordinary skill in the art to which the present disclosure pertains.

According to an aspect of the present disclosure, an autonomous driving control apparatus may include a sensor device, a communication device, a memory configured to store instructions, and a controller operatively connected with the sensor device and the communication device. For example, the instructions may be configured to, when executed by the controller, cause the autonomous driving control apparatus to receive a control signal including user vehicle information from a server, using the communication device. The instructions may also be configured to cause the autonomous driving control apparatus to control a mobile device to a specified place, based on the control signal. The instructions may also be configured to cause the autonomous driving control apparatus to obtain at least one piece of image data about at least one vehicle in the specified place, using the sensor device. The instructions may also be configured to cause the autonomous driving control apparatus to detect at least one of two-dimensional (2D) data, three-dimensional (3D) data, or a combination thereof for each of the at least one vehicle based on the at least one piece of image data. The instructions may also be configured to cause the autonomous driving control apparatus to search for a user vehicle among the at least one vehicle based on at least one of the at least one piece of image data, the 2D data, the 3D data, the user vehicle information, or a combination thereof.

According to an embodiment, the sensor device may include a first camera and a second camera. For example, the instructions may be configured to, when executed by the controller, cause the autonomous driving control apparatus to obtain first image data for each of the at least one vehicle, using the first camera, or obtain second image data for each of the at least one vehicle, using the second camera.

According to an embodiment, the first camera may include a red-green-blue (RGB) camera and the second camera may include an infra-red (IR) camera.

According to an embodiment, the instructions may be configured to, when executed by the controller, cause the autonomous driving control apparatus to obtain at least one of the 2D data, the 3D data, or a combination thereof for each of the at least one vehicle based on the first image data.

According to an embodiment, the 2D data may include coordinate data of a bounding box for each of the at least one vehicle being present in the specified place.

According to an embodiment, the 3D data may include at least one of a cuboid, a roll angle, a pitch angle, a yaw angle, or a combination thereof for each of the at least one vehicle being present in the specified place.

According to an embodiment, the autonomous driving control apparatus may further include a first search device including a temperature-based determiner. The instructions may be configured to, when executed by the controller, cause the autonomous driving control apparatus to search for a bounding box with a specified temperature or more based on at least one of the 2D data, the 3D data, the second image data, or a combination thereof, using the first search device.

According to an embodiment, the autonomous driving control apparatus may further include a second search device including a vehicle type recognizer and a vehicle number recognizer. For example, the instructions may be configured to, when executed by the controller, cause the autonomous driving control apparatus to control the mobility device to move adjacent to a vehicle corresponding to the bounding box identified as having the specified temperature or more. The instructions may also be configured to cause the autonomous driving control apparatus to obtain vehicle information of the vehicle corresponding to the bounding box based on the first image data. The instructions may also be configured to cause the autonomous driving control apparatus to search for the user vehicle, based on whether the vehicle information is identical to the user vehicle information, using the second search device.

According to an embodiment, the control signal may include at least one of a vehicle type of the user vehicle, a vehicle number of the user vehicle, pickup product information, location information of the specified place, or a combination thereof being received from a user by the server.

According to an embodiment, the vehicle information may include at least one of a vehicle type of the vehicle corresponding to the bounding box, a vehicle number of the vehicle, or a combination thereof.

According to another aspect of the present disclosure, an autonomous driving control system may include a server configured to receive a control signal including at least one of user vehicle information, pickup order information, or a combination thereof from a user and to transmit the control signal to an driving autonomous control apparatus for controlling a mobility device including a pickup product corresponding to the pickup order information. The autonomous driving control system may include the autonomous driving control apparatus configured to control the mobility device to a specified place based on the control signal, identify at least one of at least one piece of image data, 2D data, 3D data, or a combination thereof about at least one vehicle in the specified place, and to search for a user vehicle corresponding to the user among the at least one vehicle.

According to an embodiment, the autonomous driving control apparatus may be configured to obtain first image data for each of the at least one vehicle, using a first camera or obtain second image data for each of the at least one vehicle, using a second camera. For example, the first camera may include a red-green-blue (RGB) camera, and the second camera may include an infra-red (IR) camera.

According to an embodiment, the autonomous driving control apparatus may be configured to obtain at least one of the 2D data, the 3D data, or a combination thereof for each of the at least one vehicle based on the first image data. The 2D data may include coordinate data of a bounding box for each of the at least one vehicle being present in the specified place. The 3D data may include at least one of a cuboid, a roll angle, a pitch angle, a yaw angle, or a combination thereof for each of the at least one vehicle being present in the specified place.

According to an embodiment, the autonomous driving control apparatus may be configured to search for a bounding box with a specified temperature or more based on at least one of the 2D data, the 3D data, the second image data, or a combination thereof. The autonomous driving control apparatus may be also configured to control the mobility device to the bounding box identified as having the specified temperature or more. The autonomous driving control apparatus may be also configured to obtain vehicle information of a vehicle corresponding to the bounding box, based on the first image data. The autonomous driving control apparatus may be also configured to search for the user vehicle, based on whether the vehicle information is identical to the user vehicle information.

According to an embodiment, the driving control apparatus may be configured to deliver the pickup product to a specified area of the vehicle when the vehicle information is identical to the user vehicle information.

According to an aspect of the present disclosure, an autonomous driving control method may include receiving, by a controller, a control signal including user vehicle information from a server. The autonomous driving control method may also include using a communication device, controlling, by the controller, a mobility device to a specified place, based on the control signal. The autonomous driving control method may also include obtaining, by the controller, at least one piece of image data about at least one vehicle in the specified place, using a sensor device. The autonomous driving control method may also include detecting, by the controller, at least one of 2D data, 3D data, or a combination thereof for each of the at least one vehicle, based on the at least one piece of image data. The autonomous driving control method may also include searching for, by the controller, a user vehicle among the at least one vehicle, based on at least one of the at least one piece of image data, the 2D data, the 3D data, the user vehicle information, or a combination thereof.

According to an embodiment, the sensor device may include a first camera and a second camera. Obtaining the at least one piece of image data using the sensor device by the controller may include obtaining, by the controller, first image data for each of the at least one vehicle using the first camera or obtaining, by the controller, second image data for each of the at least one vehicle using the second camera.

According to an embodiment, the first camera may include a red-green-blue (RGB) camera and the second camera may include an infra-red (IR) camera.

According to an embodiment, the detecting of the at least one of the 2D data, the 3D data, or the combination thereof for each of the at least one vehicle based on the at least one piece of image data by the controller may include obtaining, by the controller, at least one of the 2D data, the 3D data, or a combination thereof for each of the at least one vehicle, based on the first image data. Detecting may also include searching for, by the controller, a bounding box with a specified temperature or more, based on at least one of the 2D data, the 3D data, the second image data, or a combination thereof, using a first search device including a temperature-based determiner.

According to an embodiment, searching for the user vehicle among the at least one vehicle based on the at least one of the at least one piece of image data, the 2D data, the 3D data, the user vehicle information, or the combination thereof by the controller may include controlling, by the controller, the mobility device to move adjacent to a vehicle corresponding to the bounding box identified as having the specified temperature or more. The searching may also include obtaining, by the controller, vehicle information of the vehicle corresponding to the bounding box, based on the first image data. The searching may also include searching for, by the controller, the user vehicle based on whether the vehicle information is identical to the user vehicle information, using a second search device including a vehicle type recognizer and a vehicle number recognizer.

BRIEF DESCRIPTION OF THE DRAWINGS

The above and other objects, features, and advantages of the present disclosure should be more apparent from the following detailed description taken in conjunction with the accompanying drawings.

Figure 1:
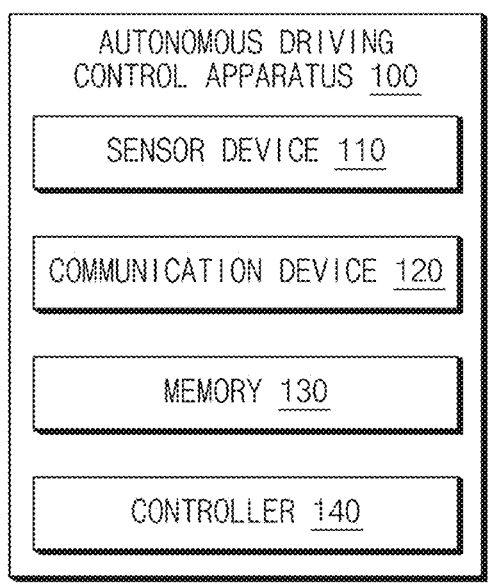
FIG. 1 is a block diagram illustrating components of an autonomous driving control apparatus according to an embodiment of the present disclosure.

With regard to description of drawings, the same or similar denotations may be used for the same or similar components.

DETAILED DESCRIPTION

Hereinafter, some embodiments of the present disclosure are described in detail with reference to the drawings. In the drawings, the same reference numerals are used throughout to designate the same or equivalent elements. In addition, a detailed description of well-known features or functions has been omitted in order not to unnecessarily obscure the gist of the present disclosure.

In describing the components of the embodiment according to the present disclosure, terms such as first, second, "A", "B", (a), (b), and the like may be used. These terms are only used to distinguish one element from another element but do not limit the corresponding elements irrespective of the order or priority of the corresponding elements. Furthermore, unless otherwise defined, all terms including technical and scientific terms used herein should be interpreted as is customary in the art to which this present disclosure belongs. It should be understood that terms used herein are interpreted as having a meaning that is consistent with their meaning in the context of this disclosure and the relevant art and should not be interpreted in an idealized or overly formal sense unless expressly so defined herein. When a component, device, element, or the like of the present disclosure is described as having a purpose or performing an operation, function, or the like, the component, device, or element should be considered herein as being "configured to" meet that purpose or to perform that operation or function. Each of the components, devices, elements, and the like may separately embody or be included with a processor and a memory, such as a non-transitory computer readable media, as part of the apparatus.

Hereinafter, embodiments of the present disclosure are described in detail with reference to FIGS. 1-9.

FIG. 1 is a block diagram illustrating components of an autonomous driving control apparatus according to an embodiment of the present disclosure.

According to an embodiment, an autonomous driving control apparatus 100 may include at least one of sensor device 110, a communication device 120, a memory 130, a controller 140, or a combination thereof. The components of the autonomous driving control apparatus 100, which are shown in FIG. 1, are illustrative, and embodiments of the present disclosure are not limited thereto. For example, the autonomous driving control apparatus 100 may further include components (e.g., at least one of an interface, a display, a sound output device, a detection device 230 of FIG. 2, a search device 240 of FIG. 2, or a combination thereof), which are not shown in FIG. 1. For example, the detection device 230 and/or the search device 240 of FIG. 2, which are described below, may be implemented as a part of the controller 140.

According to an embodiment, the autonomous driving control apparatus 100 may control a mobility device (e.g., a mobile robot), using at least some of the above-mentioned components.

According to an embodiment, the sensor device 110 may obtain (or sense) various pieces of information used for driving of the mobility device.

For example, the sensor device 110 may include at least one sensor including at least one of a camera, radar, light detection and ranging (LiDAR), or a combination thereof.

As an example, the sensor device 110 may include a first camera and a second camera independent of the first camera. The first camera may include, for example, a red-green-blue (RGB) camera. The sensor device 110 may obtain first image data including an RGB image, using the first camera. The second camera may include, for example, an infra-red (IR) camera. The sensor device 110 may obtain second image data including a thermal image (or an IR image), using the second camera.

For example, the sensor device 110 may obtain information about an external object (e.g., at least one of a person, another vehicle, a building, a structure, or a combination thereof), using the at least one sensor.

For example, the sensor device 110 may obtain image data about an area adjacent to the mobility device. As an example, when the mobility device is present in a specified place, the sensor device 110 may obtain image data about at least one vehicle in the specified place.

According to an embodiment, the communication device 120 may establish a communication channel (e.g., a wireless communication channel) between the autonomous driving control apparatus 100 and an external device (e.g., a server 202 of FIG. 2) and may assist in communicating over the established communication channel. For example, the communication device 120 may include one or more communication processors, which operate independently of the 140 controller (e.g., an application processor) and support direct (e.g., wired) communication or wireless communication.

For example, the communication device 120 may include a wireless communication module (e.g., a cellular communication module, a short range wireless communication module, or a global navigation satellite system (GNSS) communication module) or a wired communication module (e.g., a local area network (LAN) communication module or a power line communication module). The corresponding communication among such communication modules may communicate with the external device over a first network (e.g., a short range communication network such as Bluetooth, wireless-fidelity (Wi-Fi) Direct, or infrared data association (IrDA)) or a second network (e.g., a long range communication network such as a legacy cellular network, a fifth generation (5G) network, a next-generation communication network, the Internet, or a computer network (e.g., a local area network (LAN) or a wide area network (WAN))). Such types of communication modules may be integrated into one component (e.g., a single chip) or may be implemented as a plurality of components (e.g., a plurality of chips) independent of each other. Furthermore, the communication device 120 and the controller 140 may be implemented as a single chip.

For example, the communication device 120 may transmit and receive various pieces of data based on communication with the external device.

As an example, the communication device 120 may receive a control signal from the external device. The control signal may include at least one of information (e.g., a vehicle type or a vehicle number) of a user vehicle, which is a destination of the mobility device, pickup product information, location information of a specified place, or a combination thereof.

According to an embodiment, the memory 130 may store a command or data. For example, the memory 130 may store one or more instructions, when executed by the controller 140, causing the autonomous driving control apparatus 100 to perform various operations.

For example, the memory 130 and the controller 140 may be implemented as one chipset. The controller 140 may include at least one of a communication processor or a modem.

For example, the memory 130 may store various pieces of information associated with the driving control apparatus 100. As an example, the memory 130 may store information about an operation history of the controller 140. As an example, the memory 130 may store pieces of information associated with states and/or operations of components (e.g., a driving device (or a motor)) of the mobility device (or the mobile robot) controlled by the autonomous driving control apparatus 100 and/or components (e.g., at least one of the sensor device 110, the communication device 120, or a combination thereof) of the autonomous driving control apparatus 100.

According to an embodiment, the controller 140 may be operatively connected with at least one of the sensor device 110, the communication device 120, the memory 130, or a combination thereof. For example, the controller 140 may control an operation of at least one of the sensor device 110, the communication device 120, the memory 130, or a combination thereof.

For example, the controller 140 may receive a control signal including user vehicle information from a server, using the communication device 120. As an example, the control signal may include at least one of information (e.g., a vehicle type or a vehicle number) of a user vehicle, which is a destination of the mobility device, pickup product information, location information of a specified place, or a combination thereof. The embodiment where the controller 140 receives the control signal communication using the device 120 is illustrative, and embodiments of the present disclosure are not limited thereto. For example, the controller 140 may receive the above mentioned pieces of information from a user through the interface.

For example, the controller 140 may control the mobility device to a specified place based on the control signal. As an example, the controller 140 may control the mobility device to move to a specified place (e.g., at least one of an indoor parking lot, an outdoor parking lot, or a combination thereof) to deliver a pickup product requested by the user.

For example, the controller 140 may obtain image data about the specified place, using the sensor device 110.

As an example, the controller 140 may obtain first image data for each of at least one vehicle in the specified place, using the first camera included in the sensor device 110. The first camera may include, for example, an RGB camera. In other words, the first image data may include RGB image data.

As an example, the controller 140 may obtain second image data for each of the at least one vehicle in the specified place, using the second camera included in the sensor device 110. The second camera may include, for example, an IR camera. In other words, the second image data may include IR image (or thermal image) data. The second image data may include thermal information of each of the at least one vehicle in the specified place.

For example, the controller 140 may detect at least one of two-dimensional (2D) data, three-dimensional (3D) data, or a combination thereof for each of the at least one vehicle based on at least one piece of image data.

As an example, the controller 140 may obtain (or detect) at least one of 2D data, 3D data, or a combination thereof for each of the at least one vehicle based on the first image data. The 2D data may include, for example, coordinate data of a bounding box for each of the at least one vehicle, which is present in the specified place.

The 3D data may include, for example, information about at least one of a cuboid, a roll angle, a pitch angle, a yaw angle, or a combination thereof for each of the at least one vehicle, which is present in the specified place.

For example, the controller 140 may search for a user vehicle among the at least one vehicle based on at least one of the at least one piece of image data, the 2D data, the 3D data, the user vehicle information, or a combination thereof.

Figure 2:
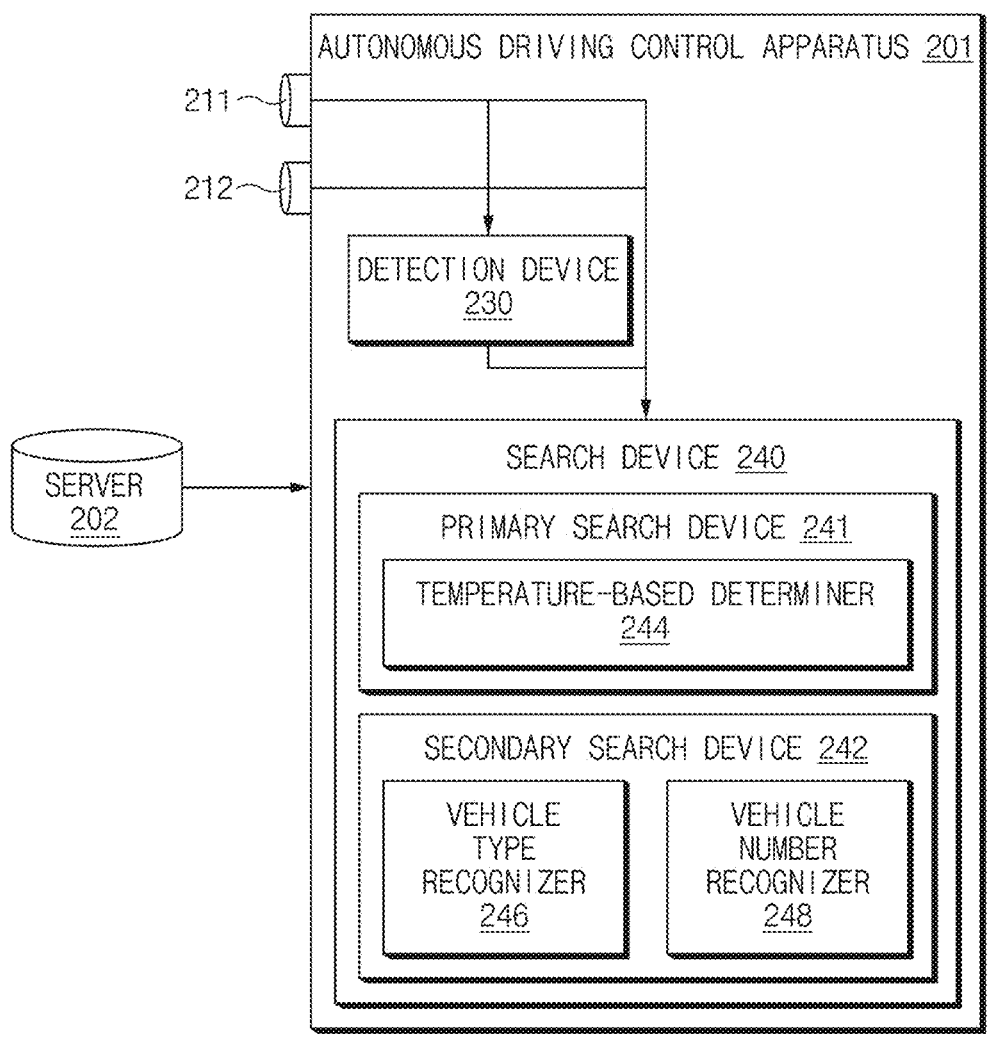
FIG. 2 is a conceptual diagram illustrating an operation between an autonomous driving control apparatus and a server according to an embodiment of the present disclosure.

As an example, the controller 140 may search for a bounding box with a specified temperature or more based on at least one of the 2D data, the 3D data, the second image data, or a combination thereof, using a search device (e.g., the search device 240 of FIG. 2). In other words, the controller 140 may search for a bounding box corresponding to a vehicle with a specified temperature or more among the at least one vehicle. The controller 140 may control the mobility device to move adjacent to the vehicle corresponding to the bounding box identified as having the specified temperature or more.

As an example, the controller 140 may obtain vehicle information of the vehicle corresponding to the bounding box based on the first image data. The vehicle information may include at least one of, for example, a vehicle type of the vehicle corresponding to the bounding box, a vehicle number of the vehicle, or a combination thereof.

As an example, the controller 140 may search for whether the vehicle information is identical to the user vehicle information, using the search device. For example, when the vehicle information of the vehicle corresponding to the bounding box identified as having the specified temperature or more is identical to the user vehicle information included in the control signal, the controller 140 may identify the vehicle as a user vehicle.

FIG. 2 is a conceptual diagram illustrating an operation between an autonomous driving control apparatus and an external device included in at least one other vehicle according to an embodiment of the present disclosure.

According to an embodiment, an autonomous driving control apparatus 201 (e.g., an autonomous driving control apparatus 100 of FIG. 1) may communicate with a server 202 using a communication device (e.g., a communication device 120 of FIG. 1).

According to an embodiment, the server 202 may receive a control signal to deliver a pickup product to a user vehicle by means of a mobility device from a user. For example, the control signal may include at least one of user vehicle information, pickup order information, or a combination thereof. As an example, the user vehicle information may include at least one of a vehicle type of the user vehicle, a vehicle number of the user vehicle, or a combination thereof. As an example, the pickup order information may include at least one of pickup product information, a pickup request time, location information of a specified place, or a combination thereof.

According to an embodiment, the server 202 may transmit the control signal to the autonomous driving control apparatus 201. For example, the server 202 may transmit the control signal to the autonomous driving control apparatus 201 for controlling a mobility device including (or mounting) a pickup product corresponding to the pickup order information.

According to an embodiment, the autonomous driving control apparatus 201 may control the mobility device based on the control signal received from the server 202. For example, the autonomous driving control apparatus 201 may include at least one of a first camera 211, a second camera 212, a detection device 230, a search device 240, or a combination thereof. For example, the search device 240 may include a primary search device 241 including a temperature-based determiner 244 and a secondary search device 242 including a vehicle type recognizer 246 and a vehicle number recognizer 248.

For example, the autonomous driving control apparatus 201 may control the mobility device to the specified place.

As an example, the autonomous driving control apparatus 201 may control the mobility device to move to the specified place, using the location information of the specified place included in the control signal.

For example, when the mobility device moves to the specified place, the autonomous driving control apparatus 201 may identify at least one of at least one piece of image data, 2D data, 3D data, or a combination thereof about at least one vehicle in the specified place using at least a part of a sensor device (e.g., a sensor device 110 of FIG. 1) and may search for a user vehicle corresponding to the user among the at least one vehicle.

As an example, the autonomous driving control apparatus 201 may obtain first image data for each of the at least one vehicle, using the first camera 211 included in the sensor device. The first camera 211 may include, for example, an RGB camera.

As an example, the autonomous driving control apparatus 201 may obtain second image data for each of the at least one vehicle, using the second camera 212 included in the sensor device. The second camera 212 may include, for example, an IR camera.

For example, the autonomous driving control apparatus 201 may detect at least one of 2D data, 3D data, or a combination thereof from the first image data obtained using the first camera 211 and/or the second image data obtained using the second camera 212, using the detection device 230.

As an example, the 2D data may include coordinate data of a bounding box for each of the at least one vehicle, which is present in the specified place.

As an example, the 3D data may include at least one of a cuboid, a roll angle, a pitch angle, a yaw angle, or a combination thereof for each of the at least one vehicle, which is present in the specified place.

For example, the autonomous driving control apparatus 201 may search for a user vehicle candidate group, using the primary search device (or a first search device) 241 including the temperature-based determiner 244.

As an example, the autonomous driving control apparatus 201 may search for a bounding box with a specified temperature or more based on at least one of the 2D data, the 3D data, the second image data, or a combination thereof, using the primary search device 241. For example, the autonomous driving control apparatus 201 may identify at least one bounding box with the specified temperature or more among bounding boxes obtained using the detection device 230.

As an example, the autonomous driving control apparatus 201 may identify that one of the at least one bounding box with the specified temperature or more is a bounding box corresponding to the user vehicle. In other words, because a vehicle that has just arrived at the specified location to receive a pickup product has the specified temperature or more, the autonomous driving control apparatus 201 may identify one of the at least one bounding box with the specified temperature or more is the bounding box corresponding to the user vehicle.

For example, the autonomous driving control apparatus 201 may search for a user vehicle, using the secondary search device (or a second search device) 242 including the vehicle type recognizer 246 and the vehicle number recognizer 248.

As an example, the autonomous driving control apparatus 201 may control a mobility device to be adjacent to a vehicle corresponding to the bounding box identified as having the specified temperature or more and may obtain vehicle information of the vehicle corresponding to the bounding box based on the first image data.

As an example, the vehicle information obtained based on the first image data may include at least one of a vehicle type of the vehicle corresponding to the bounding box, a vehicle number of the vehicle, or a combination thereof.

As an example, the autonomous driving control apparatus 201 may determine whether the vehicle information of the vehicle corresponding to the bounding box is identical to user vehicle information included in the control signal received from the server 202, using the secondary search device 242.

As an example, when the vehicle information is identical to the user vehicle information, the autonomous driving control apparatus 201 may identify that the vehicle is a user vehicle. In this case, the autonomous driving control apparatus 201 may control the mobility device to deliver a pickup product included in the mobility device to a specified area of the vehicle. Additionally or alternatively, the autonomous driving control apparatus 201 may visually and/or audibly provide information that preparation for delivering the pickup product to the user is completed.

As an example, when the vehicle information is not identical to the user vehicle information, the autonomous driving control apparatus 201 may repeatedly perform the above-mentioned method for controlling the mobility device to one of the at least one bounding box with the specified temperature or more and identifying whether the vehicle is the user vehicle using the secondary search device 242.

Figure 3:
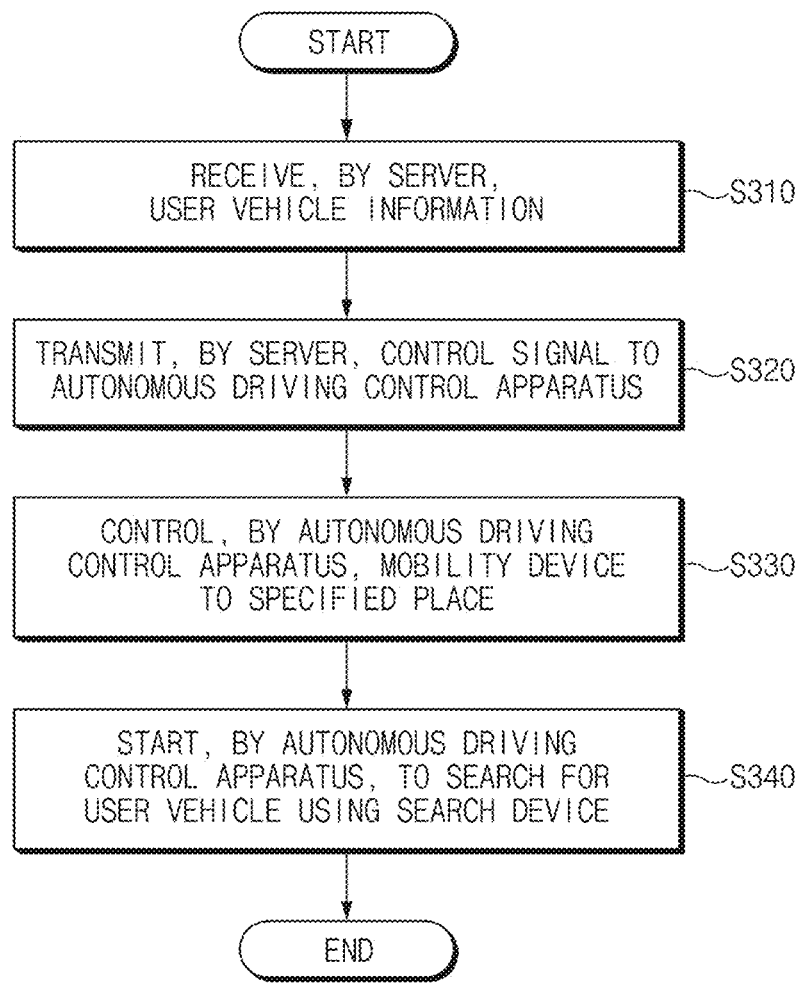
FIG. 3 is an operational flowchart of an autonomous driving control apparatus according to an embodiment of the present disclosure.

FIG. 3 is an operational flowchart of an autonomous driving control apparatus according to an embodiment of the present disclosure.

According to an embodiment, an autonomous driving control system including an autonomous driving control apparatus (e.g., an autonomous driving control apparatus 100 or 201 of FIG. 1 or FIG. 2) and a server (e.g., a server 202 of FIG. 2) may perform operations disclosed in FIG. 3. For example, at least some of components (e.g., a sensor device 110 of FIG. 1, a communication device 120 of FIG. 1, a memory 130 of FIG. 1, a controller 140 of FIG. 1, a detection device 230 of FIG. 2, a search device 240 of FIG. 2, or a combination thereof) included in the autonomous driving control apparatus and the server may be configured to perform the operations of FIG. 3.

Operations in S310-S340 in an embodiment below may be sequentially performed but are not necessarily sequentially performed. For example, an order of the respective operations may be changed, and at least two operations may be performed in parallel. Furthermore, contents, which correspond to or are duplicated with the contents described above in conjunction with FIG. 3, may be briefly described or omitted.

According to an embodiment, in S310, the server may receive user vehicle information.

For example, the server may receive a control signal including the user vehicle information from a user. As an example, the server may receive the control signal to deliver a pickup product to a user vehicle by means of a mobility device from the user. The control signal may include at least one of, for example, user vehicle information, pickup order information, or a combination thereof. As an example, the user vehicle information may include at least one of a vehicle type of the user vehicle, a vehicle number of the user vehicle, or a combination thereof. As an example, the pickup order information may include at least one of pickup product information, a pickup request time, location information of a specified place, or a combination thereof.

According to an embodiment, in S320, the server may transmit the control signal to the autonomous driving control apparatus.

For example, the server may transmit the control signal to the autonomous driving control apparatus for controlling a mobility device including (or mounting) a pickup product corresponding to the pickup order information.

According to an embodiment, in S330, the autonomous driving control apparatus may control the mobile device to the specified place.

For example, the autonomous driving control apparatus may control the mobility device based on the control signal received from the server. As an example, the autonomous driving control apparatus may move the mobility device to the specified place, using the location information of the specified place included in the control signal.

According to an embodiment, in S340, the autonomous driving control apparatus may start to search for a user vehicle, using a search device (e.g., a search device 240 of FIG. 2).

For example, the autonomous driving control apparatus may detect at least one of 2D data, 3D data, or a combination thereof for each of at least one vehicle, which is present in the specified place, based on image data about the specified place, which is obtained using the sensor device. The autonomous driving control apparatus may search for the user vehicle for delivery of a pickup product among the at least one vehicle based on the image data and the detected result.

Figure 4:
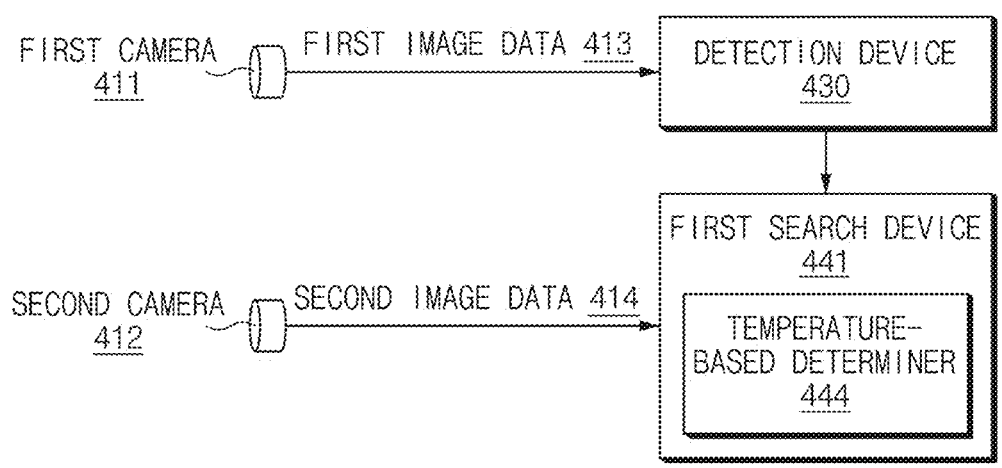
FIG. 4 is an operational conceptual diagram of an autonomous driving control apparatus according to an embodiment of the present disclosure.

FIG. 4 is an operational conceptual diagram of an autonomous driving control apparatus according to an embodiment of the present disclosure.

According to an embodiment, an autonomous driving control apparatus (e.g., an autonomous driving control apparatus 100 or 201 of FIG. 1 or FIG. 2) may include at least one camera included in a sensor device (e.g., a sensor device 110 of FIG. 1). For example, the autonomous driving control apparatus may include a first camera 411 and a second camera 412.

For example, the first camera 411 may include a red-green-blue (RGB) camera.

For example, the second camera 412 may include an infra-red (IR) camera.

According to an embodiment, the autonomous driving control apparatus may process first image data 413 obtained using the first camera 411 using a detection device 430.

For example, the autonomous driving control apparatus may obtain at least one of 2D data, 3D data, or a combination thereof for each of at least one vehicle included in the first image data 413, using the detection device 430.

As an example, the 2D data may include coordinate data of a bounding box for each of the at least one vehicle, which is present in a specified place (e.g., an indoor parking lot or an outdoor parking lot).

As an example, the 3D data may include at least one of a cuboid, a roll angle, a pitch angle, a yaw angle, or a combination thereof for each of the at least one vehicle, which is present in the specified place.

According to an embodiment, the autonomous driving control apparatus may process second image data 414 obtained using the second camera 412, using a first search device 441.

For example, the autonomous driving control apparatus may identify a temperature of each of the at least one vehicle included in the second image data 414, using the first search device 441 including a temperature-based determiner 444.

For example, the autonomous driving control apparatus may process at least one of the detected result output from the detection device 430 based on the first image data 413, the second image data 414, or a combination thereof by means of the first search device 441. Thus, the autonomous driving control apparatus may obtain location information and temperature information of each of the at least one vehicle which is present in the specified place.

Figure 5:
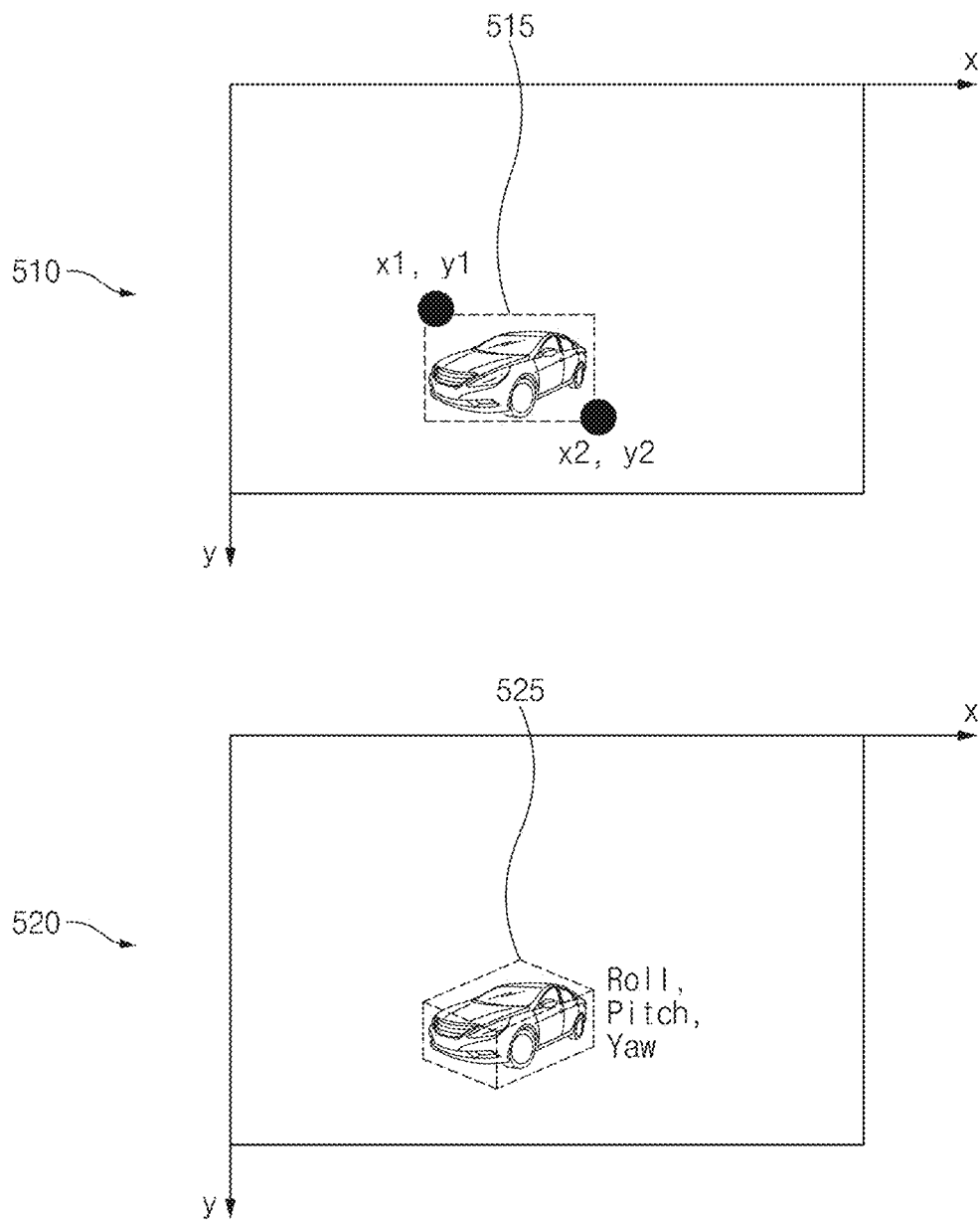
FIG. 5 is an operational conceptual diagram of detecting information about a vehicle using image data according to an embodiment of the present disclosure.

FIG. 5 is an operational conceptual diagram of detecting information about a vehicle using image data according to an embodiment of the present disclosure.

According to an embodiment, an autonomous driving control apparatus (e.g., an autonomous driving control apparatus 100 or 201 of FIG. 1 or FIG. 2) may obtain 2D data and/or 3D data, using at least a portion of image data about at least one vehicle in a specified place obtained using a sensor device (e.g., a sensor device 110 of FIG. 1).

Referring to reference numeral 510, according to an embodiment, the autonomous driving control apparatus may obtain 2D data including coordinate data of a bounding box 515 of the at least one vehicle, which is present in the specified place, based on RGB image data obtained using an RGB camera.

For example, the autonomous driving control apparatus may obtain each of coordinates (x1, y1) at a left upper point of the bounding box 515 and coordinates (x2, y2) at a right lower point of the bounding box 515.

Referring to reference numeral 520, according to an embodiment, the autonomous driving control apparatus may obtain 3D data 525 including 3D location information of the at least one vehicle, which is present in the specified place, based on the RGB image data obtained using the RGB camera.

For example, the autonomous driving control apparatus may obtain the 3D data 525 including at least one of a cuboid, a roll angle, a pitch angle, a yaw angle, or a combination thereof for each of the at least one vehicle.

According to an embodiment, the autonomous driving control apparatus may identify a vehicle corresponding to a bounding box with a specified temperature T or more using Equation 1, Equation 2, and Equation 3 below. For example, the autonomous driving control apparatus may identify the vehicle corresponding to the bounding box with the specified temperature T or more using the Equations below, based on 2D data, 3D data, and thermal image data (e.g., second image data 414 of FIG. 4). As an example, the vehicle corresponding to the bounding box with the specified temperature T or more may be a vehicle that has just arrived at the specified location (e.g., parking lot). As an example, the vehicle corresponding to the bounding box with the specified temperature T or more may be a vehicle in which the engine is turned on. Thus, such a vehicle may be a vehicle that has just arrived at a specified location to receive a pick-up item.

$$I_{sorted} = sort(I(x, y)|\begin{matrix} \forall x, x_1 \leq x < x_2 \\ \forall y, y_1 \leq y < y_2 \end{matrix}) \quad \text{[Equation 1]}$$

$$I_{mean} = Avg(topk(I_{sorted})) \quad \text{[Equation 2]}$$

$$C_{box} = \begin{cases} 0, & \text{if } I_{mean} < T \\ 1, & \text{otherwise} \end{cases} \quad \text{[Equation 3]}$$

For example, in Equation 2 above, Avg may refer to the average calculation. For example, topk may refer to top k subsets.

Figure 6:
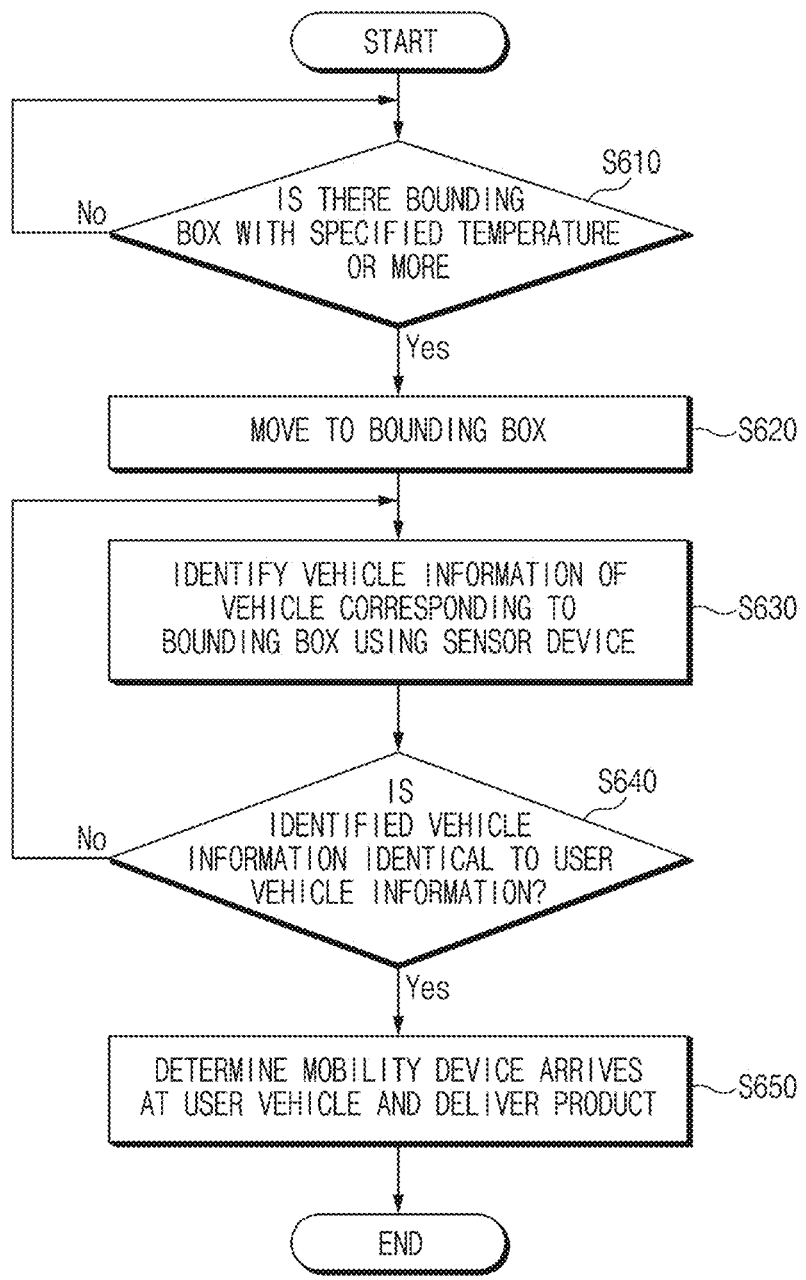
FIG. 6 is an operational flowchart of an autonomous driving control apparatus according to an embodiment of the present disclosure.

FIG. 6 is an operational flowchart of an autonomous driving control apparatus according to an embodiment of the present disclosure.

According to an embodiment, an autonomous driving control apparatus (e.g., an autonomous driving control apparatus 100 or 201 of FIG. 1 or 2) may perform operations disclosed in FIG. 6. For example, at least some of components (e.g., a sensor device 110 of FIG. 1, a communication device 120 of FIG. 1, a memory 130 of FIG. 1, a controller 140 of FIG. 1, a detection device 230 of FIG. 2, a search device 240 of FIG. 2, or a combination thereof) included in the autonomous driving control apparatus may be configured to perform the operations of FIG. 6.

Operations in S610-S650 in an embodiment below may be sequentially performed but are not necessarily sequentially performed. For example, an order of the respective operations may be changed, and at least two operations may be performed in parallel. Furthermore, contents, which correspond to or are duplicated with the contents described above in conjunction with FIG. 6, may be briefly described or omitted.

According to an embodiment, the operations of FIG. 6 may be referred to as operations after the autonomous driving control apparatus obtains 2D data and 3D data associated with each of at least one vehicle in a specified place.

According to an embodiment, in S610, the autonomous driving control apparatus may determine whether there is a bounding box with a specified temperature or more.

As an example, the autonomous driving control apparatus may identify whether there is the bounding box with the specified temperature or more in the specified place, using a first search device (e.g., a first search device 441 of FIG. 4) including a temperature-based determiner (e.g., a temperature-based determiner 444 of FIG. 4).

For example, when there is the bounding box with the specified temperature or more (e.g., S610—Yes), the autonomous driving control apparatus may perform S620.

For example, unless when there is no bounding box with the specified temperature or more (e.g., S610—No), the autonomous driving control apparatus may repeatedly perform S610.

According to an embodiment, in S620, the autonomous driving control apparatus may move a mobility device (e.g., a mobile robot having a pickup product) to the bounding box.

For example, the autonomous driving control apparatus may move the mobility device to a position adjacent to a vehicle corresponding to the bounding box with the specified temperature or more.

For example, when the bounding box with the specified temperature or more is identified as being plural, the autonomous driving control apparatus may move the mobility device to be adjacent to the vehicle corresponding to the bounding box, which is closest to a current location of the mobility device.

According to an embodiment, in S630, the autonomous driving control apparatus may identify vehicle information of the vehicle corresponding to the bounding box, using a sensor device (e.g., a sensor device 110 of FIG. 1).

For example, when the mobility device moves to the position adjacent to the vehicle corresponding to the bounding box with the specified temperature or more, the autonomous driving control apparatus may identify (or obtain) information about the vehicle, using the sensor device. As an example, the autonomous driving control apparatus may identify vehicle information of the vehicle, using a camera. As an example, the vehicle information may include at least one of a vehicle type of the vehicle corresponding to the bounding box with the specified temperature or more, a vehicle number of the vehicle, or a combination thereof.

According to an embodiment, in S640, the autonomous driving control apparatus may determine whether the identified vehicle information is identical to user vehicle information.

For example, the autonomous driving control apparatus may compare the user vehicle information included in a control signal received from a server with the vehicle information. As an example, the control signal may include at least one of a vehicle type of a user vehicle, a vehicle number of the user vehicle, pickup product information, location information of a specified place, or a combination thereof, which is received from the user by the server.

For example, when the vehicle information is identical to the user vehicle information (e.g., S640—Yes), the autonomous driving control apparatus may perform S650.

For example, when the vehicle information is not identical to the user vehicle information (e.g., S640—No), the autonomous driving control apparatus may repeatedly perform S630. As another example, the autonomous driving control apparatus may move the mobility device again to be adjacent to another vehicle corresponding to a bounding box, which is closest to a current location of the mobility device, among bounding boxes with the specified temperature or more.

According to an embodiment, in S650, the autonomous driving control apparatus may determine whether the mobility device arrives at the user vehicle and may deliver a product.

For example, the autonomous driving control apparatus may determine that the mobility device arrives at the user vehicle and may deliver a pickup product requested by the user to the user by means of the mobility device.

For example, the autonomous driving control apparatus may control the mobility device to deliver the pickup product included in the mobility device to a specified area of the vehicle. Additionally or alternatively, the autonomous driving control apparatus may visually and/or audibly provide information that preparation for delivering the pickup product to the user is completed.

Figure 7:
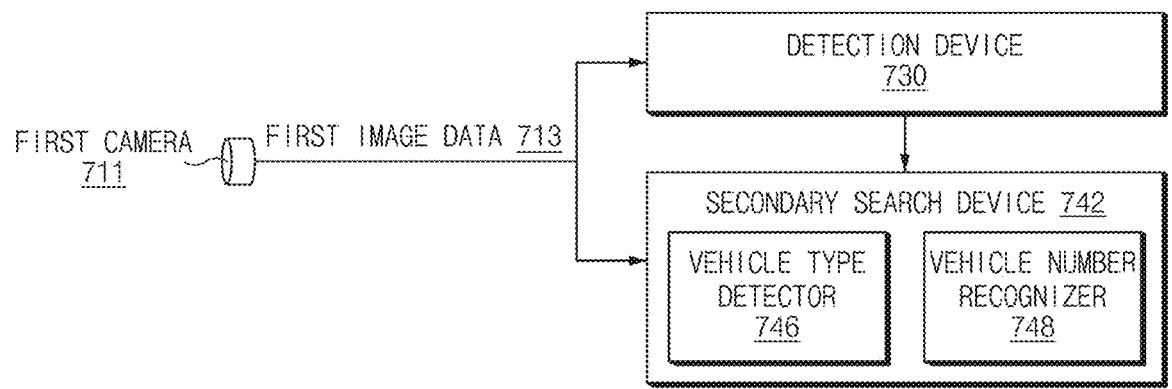
FIG. 7 is an operational conceptual diagram of an autonomous driving control apparatus according to an embodiment of the present disclosure.

FIG. 7 is an operational conceptual diagram of an autonomous driving control apparatus according to an embodiment of the present disclosure.

According to an embodiment, an autonomous driving control apparatus (e.g., an autonomous driving control apparatus 100 or 201 of FIG. 1 or FIG. 2) may include at least one camera included in a sensor device (e.g., a sensor device 110 of FIG. 1). As an example, the autonomous driving control apparatus may include a first camera 711 (e.g., a first camera 411 of FIG. 4).

For example, the first camera 711 may include a red-green-blue (RGB) camera.

According to an embodiment, the autonomous driving control apparatus may process first image data 713 (e.g., first image data 413 of FIG. 4) obtained using the first camera 711, using a detection device 730, and/or using a secondary search device 742 (e.g., a secondary search device 242 of FIG. 2).

For example, the autonomous driving control apparatus may obtain at least one of 2D data, 3D data, or a combination thereof for each of at least one vehicle included in the first image data 713, using the detection device 730.

As an example, the 2D data may include coordinate data of a bounding box for each of the at least one vehicle, which is present in a specified place (e.g., an indoor parking lot or an outdoor parking lot).

As an example, the 3D data may include at least one of a cuboid, a roll angle, a pitch angle, a yaw angle, or a combination thereof for each of the at least one vehicle which is present in the specified place.

According to an embodiment, the autonomous driving control apparatus may process the first image data 713 obtained using the first camera 711, using the secondary search device 742.

For example, the autonomous driving control apparatus may identify a vehicle type and a vehicle number of each of the at least one vehicle included in the first image data 713, using the secondary search device 742 including a vehicle type detector 746 and a vehicle number recognizer 748.

For example, the autonomous driving control apparatus may process at least one of the detected result output from the detection device 730 based on the first image data 713, the first image data 713, or a combination thereof by means of the secondary search device 742. Thus, the autonomous driving control apparatus may obtain information about a vehicle type and a vehicle number of each of the at least one vehicle, which is present in the specified place.

Figure 8:
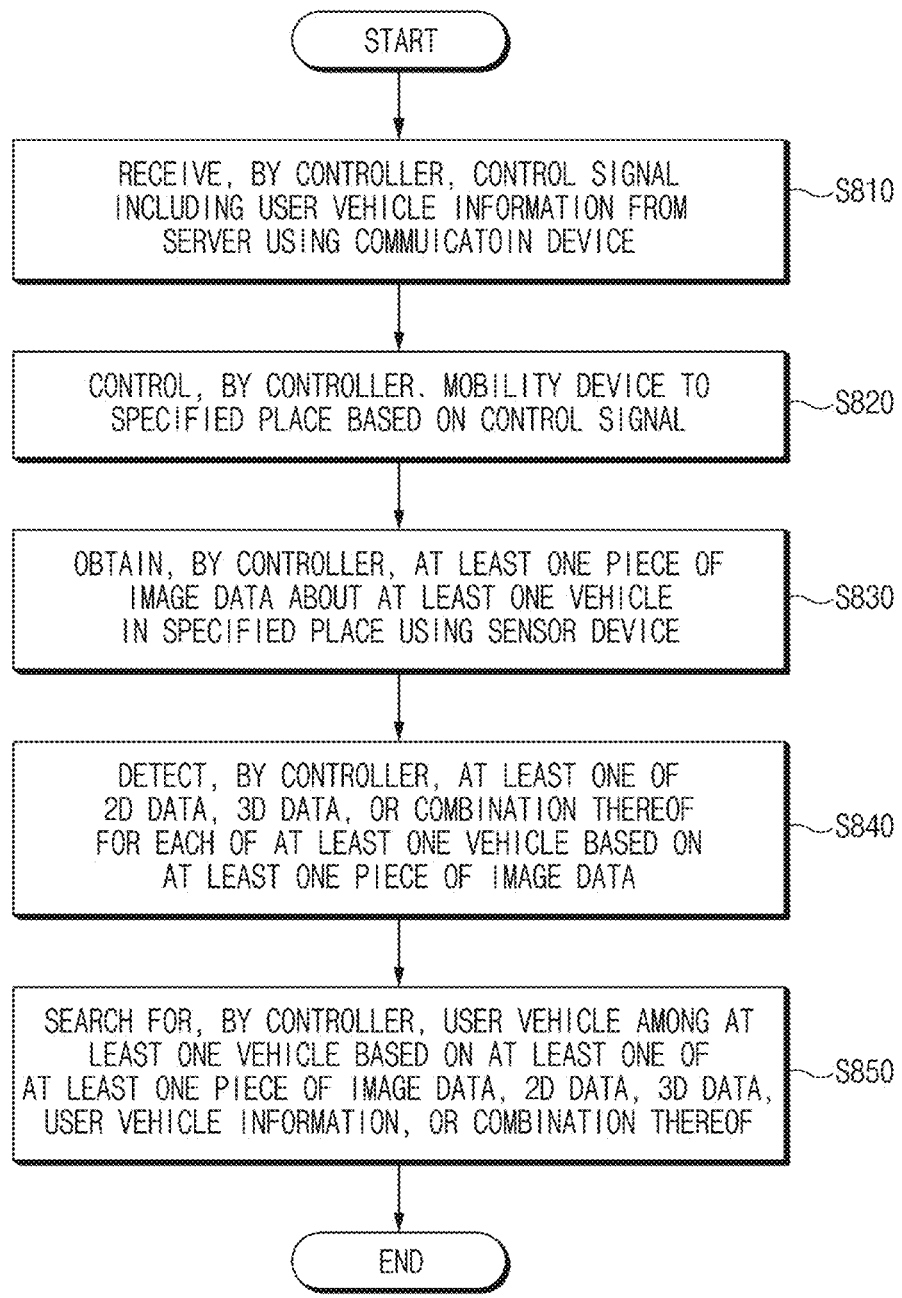
FIG. 8 is an operational flowchart of an autonomous driving control apparatus according to an embodiment of the present disclosure.

FIG. 8 is an operational flowchart of an autonomous driving control apparatus according to an embodiment of the present disclosure.

According to an embodiment, an autonomous driving control apparatus (e.g., an autonomous driving control apparatus 100 or 201 of FIG. 1 or FIG. 2) may perform operations disclosed in FIG. 8. For example, at least some of components (e.g., a sensor device 110 of FIG. 1, a communication device 120 of FIG. 1, a memory 130 of FIG. 1, a controller 140 of FIG. 1, a detection device 230 of FIG. 2, a search device 240 of FIG. 2, or a combination thereof) included in the autonomous driving control apparatus may be configured to perform the operations of FIG. 8.

Operations in S810-S850 in an embodiment below may be sequentially performed but are not necessarily sequentially performed. For example, an order of the respective operations may be changed, and at least two operations may be performed in parallel. Furthermore, contents, which correspond to or are duplicated with the contents described above in conjunction with FIG. 8, may be briefly described or omitted.

According to an embodiment, in S810, the autonomous driving control apparatus may receive a control signal including user vehicle information from a server, using a communication device.

For example, the server may receive a control signal including at least one of user vehicle information, pickup order information, or a combination thereof and may transmit the control signal to the autonomous driving control apparatus for controlling a mobility device including a pickup product corresponding to the pickup order information.

According to an embodiment, in S820, the autonomous driving control apparatus may control a mobility device to a specified place based on the control signal.

For example, the autonomous driving control apparatus may control the mobility device to move to the specified place, using location information of the specified place included in the control signal.

According to an embodiment, in S830, the autonomous driving control apparatus may obtain at least one piece of image data about at least one vehicle in the specified place, using a sensor device.

For example, the autonomous driving control apparatus may obtain first image data for each of the at least one vehicle, using a first camera included in the sensor device, and may obtain second image data for each of the at least one vehicle, using a second camera included in the sensor device. As an example, the first camera may include an RGB camera, and the second camera may include an IR camera.

According to an embodiment, in S840, the autonomous driving control apparatus may detect at least one of 2D data, 3D data, or a combination thereof for each of the at least one vehicle based on the at least one piece of image data.

For example, the autonomous driving control apparatus may detect (or obtain) at least one of 2D data, 3D data, or a combination thereof for each of the at least one vehicle based on the first image data, using a detection device.

For example, the autonomous driving control apparatus may search for a bounding box with a specified temperature or more based on at least one of the 2D data, the 3D data, the second image data, or a combination thereof, using a first search device including a temperature-based determiner.

According to an embodiment, in S850, the autonomous driving control apparatus may search for a user vehicle among the at least one vehicle based on at least one of the at least one piece of image data, the 2D data, the 3D data, the user vehicle information, or a combination thereof.

For example, the autonomous driving control apparatus may control the mobility device to move adjacent to the vehicle corresponding to the bounding box identified as having the specified temperature or more.

For example, the autonomous driving control apparatus may obtain vehicle information of the vehicle corresponding to the bounding box based on the first image data.

For example, the autonomous driving control apparatus may determine whether the vehicle information is identical to the user vehicle information, using a second search device including a vehicle type recognizer and a vehicle number recognizer.

For example, when the vehicle information is identical to the user vehicle information, the autonomous driving control apparatus may identify that the vehicle is a user vehicle for delivery of a pickup product. Thus, the autonomous driving control apparatus may deliver the pickup product to a specified area (e.g., a trunk) of the vehicle, using the mobility device.

Additionally or alternatively, the autonomous driving control apparatus may visually and/or audibly provide information that preparation for delivering the pickup product to the user is completed.

Figure 9:
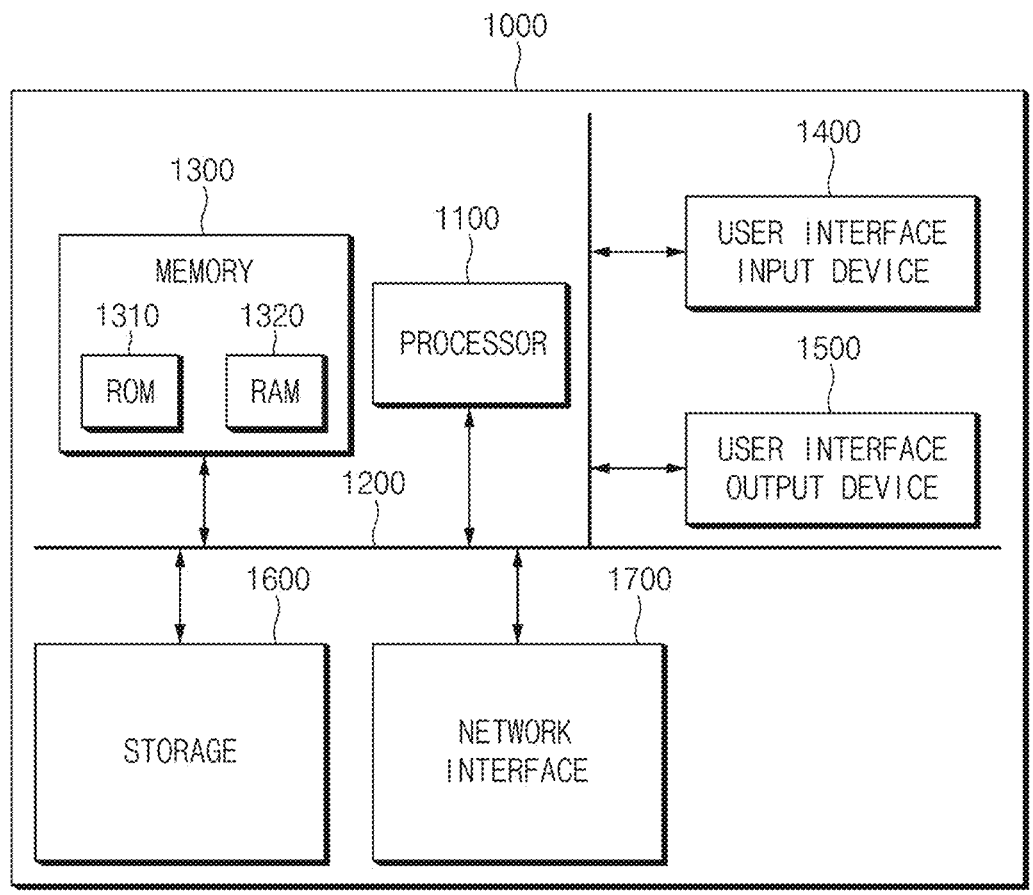
FIG. 9 illustrates a computing system about an autonomous driving control method according to an embodiment of the present disclosure.

FIG. 9 illustrates a computing system about an autonomous driving control method according to an embodiment of the present disclosure.

Referring to FIG. 9, a computing system 1000 about the autonomous driving control method may include at least one processor 1100, a memory 1300, a user interface input device 1400, a user interface output device 1500, storage 1600, and a network interface 1700, which are connected with each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) 1310 and a RAM (Random Access Memory) 1320.

Accordingly, the operations of the method or algorithm described in connection with the embodiments disclosed in the specification may be directly implemented with a hardware module, a software module, or a combination of the hardware module and the software module, which is executed by the processor 1100. The software module may reside on a storage medium (that is, the memory 1300 and/or the storage 1600), such as a RAM, a flash memory, a ROM, an EPROM, an EEPROM, a register, a hard disc, a removable disk, and a CD-ROM.

The storage medium may be coupled to the processor 1100. The processor 1100 may read out information from the storage medium and may write information in the storage medium. Alternatively, the storage medium may be integrated with the processor 1100. The processor and the storage medium may reside in an application specific integrated circuit (ASIC). The ASIC may reside within a user terminal. In another case, the processor and the storage medium may reside in the user terminal as separate components.

A description is given of effects of the autonomous driving control apparatus and the method thereof according to an embodiment of the present disclosure.

According to at least one of embodiments of the present disclosure, the autonomous driving control apparatus may more accurately control a mobility device (or a mobile robot) to a destination (e.g., a user vehicle) using various types of image data obtained by means of at least one sensor, in a situation where there is a plurality of other vehicles in the destination of the mobility device.

Furthermore, according to at least one of embodiments of the present disclosure, the autonomous driving control apparatus may control the mobility device to the destination by selectively using pieces of additional information (e.g., at least one of a temperature of the vehicle, a vehicle number of the vehicle, or a combination thereof) about the destination to provide a product delivery service with high accuracy, even when controlling the mobile robot in a place where the accuracy of positioning data using the sensor is able to be relatively low.

Furthermore, according to at least one of embodiments of the present disclosure, the autonomous driving control apparatus may more efficiently and quickly identify a target vehicle and may control the mobile robot to the target vehicle by using an image obtained using an RGB camera and an image obtained using an IR camera to identify the target vehicle to which the mobile robot will deliver a product.

In addition, various effects ascertained directly or indirectly through the present disclosure may be provided.

Hereinabove, although the present disclosure has been described with reference to embodiments and the accompanying drawings, the present disclosure is not limited thereto. The present disclosure may be variously modified and altered by those having ordinary skill in the art to which the present disclosure pertains without departing from the spirit and scope of the present disclosure claimed in the following claims.

Therefore, embodiments of the present disclosure are not intended to limit the technical spirit of the present disclosure but provided only for the illustrative purpose. The scope of the present disclosure should be construed on the basis of the accompanying claims, and all the technical ideas within the scope equivalent to the claims should be included in the scope of the present disclosure.

What is claimed is:

1. An autonomous driving control apparatus, comprising:
a sensor device;
a communication device;
a memory configured to store instructions; and
a controller operatively connected to the sensor device and the communication device,
wherein the instructions are configured to, when executed by the controller, cause the autonomous driving control apparatus to
receive a control signal including user vehicle information from a server, using the communication device,
control a mobile device to a specified place, based on the control signal, obtain at least one piece of image data about at least one vehicle in the specified place, using the sensor device, detect at least one of two-dimensional (2D) data, three-dimensional (3D) data, or a combination thereof for each of the at least one vehicle based on the at least one piece of image data, and search for a user vehicle among the at least one vehicle based on at least one of the at least one piece of image data, the 2D data, the 3D data, the user vehicle information, or a combination thereof, wherein the at least one piece of image data includes second image data for each of the at least one vehicle, obtained using a second camera included the sensor device, wherein the autonomous driving control apparatus includes a first search device including a temperature-based determiner, and wherein the autonomous driving control apparatus identifies a temperature of each of the at least one vehicle included in the second image data, using the first search device.

2. The autonomous driving control apparatus of claim 1, wherein the sensor device includes a first camera, and wherein the instructions are configured to, when executed by the controller, cause the autonomous driving control apparatus to:

obtain first image data for each of the at least one vehicle, using the first camera.

3. The autonomous driving control apparatus of claim 2, wherein the first camera includes a red-green-blue (RGB) camera, and wherein the second camera includes an infra-red (IR) camera.

4. The autonomous driving control apparatus of claim 2, wherein the instructions are configured to, when executed by the controller, cause the autonomous driving control apparatus to obtain at least one of the 2D data, the 3D data, or a combination thereof for each of the at least one vehicle based on the first image data.

5. The autonomous driving control apparatus of claim 4, further comprising:

wherein the instructions are configured to, when executed by the controller, cause the autonomous driving control apparatus to search for a bounding box with specified temperature or more based on at least one of the 2D data, the 3D data, the second image data, or a combination thereof, using the first search device.

6. The autonomous driving control apparatus of claim 5, further comprising:

a second search device including a vehicle type recognizer and a vehicle number recognizer, wherein the instructions are configured to, when executed by the controller, cause the autonomous driving control apparatus to control the mobile device to move adjacent to a vehicle corresponding to the bounding box identified as having the specified temperature or more, obtain vehicle information of the vehicle corresponding to the bounding box based on the first image data, and search for the user vehicle, based on whether the vehicle information is identical to the user vehicle information, using the second search device.

7. The autonomous driving control apparatus of claim 6, wherein the vehicle information includes at least one of a vehicle type of the vehicle corresponding to the bounding box, a vehicle number of the vehicle, or a combination thereof.

8. The autonomous driving control apparatus of claim 1, wherein the 2D data includes coordinate data of a bounding box for each of the at least one vehicle being present in the specified place.

9. The autonomous driving control apparatus of claim 1, wherein the 3D data includes at least one of a cuboid, a roll angle, a pitch angle, a yaw angle, or a combination thereof for each of the at least one vehicle being present in the specified place.

10. The autonomous driving control apparatus of claim 1, wherein the control signal includes at least one of a vehicle type of the user vehicle, a vehicle number of the user vehicle, pickup product information, location information of the specified place, or a combination thereof, being received from a user by the server.

11. An autonomous driving control system, comprising:

a server configured to receive a control signal including at least one of user vehicle information, order information, or a combination thereof from a user and to transmit the control signal to an autonomous driving control apparatus for controlling a mobility device including a pickup product corresponding to pickup order information; and the autonomous driving control apparatus configured to control the mobility device to a specified place based on the control signal, identify at least one of at least one piece of image data, 2D data, 3D data, or a combination thereof about at least one vehicle in the specified place, and to search for a user vehicle corresponding to the user among the at least one vehicle, wherein the at least one piece of image data includes second image data for each of the at least one vehicle, obtained using a second camera, wherein the autonomous driving control apparatus includes a first search device including a temperature-based determiner, and wherein the autonomous driving control apparatus identifies a temperature of each of the at least one vehicle included in the second image data, using the first search device.

12. The autonomous driving control system of claim 11, wherein the autonomous driving control apparatus is configured to:

obtain second image data for each of the at least one vehicle, using a second camera, wherein the first camera includes a red-green-blue (RGB) camera, and wherein the second camera includes an infra-red (IR) camera.

13. The autonomous driving control system of claim 12, wherein the autonomous driving control apparatus is configured to:

obtain at least one of the 2D data, the 3D data, or a combination thereof for each of the at least one vehicle based on the first image data, wherein the 2D data includes coordinate data of a bounding box for each of the at least one vehicle being present in the specified place, and wherein the 3D data includes at least one of a cuboid, a roll angle, a pitch angle, a yaw angle, or a combination thereof for each of the at least one vehicle being present in the specified place.

14. The autonomous driving control system of claim 12, wherein the autonomous driving control apparatus is configured to:
- search for a bounding box with a specified temperature or more based on at least one of the 2D data, the 3D data, the second image data, or a combination thereof;
- control the mobility device to the bounding box identified as having the specified temperature or more;
- obtain vehicle information of a vehicle corresponding to the bounding box, based on the first image data; and
- search for the user vehicle, based on whether the vehicle information is identical to the user vehicle information.

15. The autonomous driving control system of claim 14, wherein the autonomous driving control apparatus is configured to deliver the pickup product to a specified area of the vehicle, when the vehicle information is identical to the user vehicle information.

16. An autonomous driving control method, comprising:
- receiving, by a controller, a control signal including user vehicle information from a server, using a communication device;
- controlling, by the controller, a mobility device to a specified place, based on the control signal;
- obtaining, by the controller, at least one piece of image data about at least one vehicle in the specified place, using a sensor device;
- detecting, by the controller, at least one of 2D data, 3D data, or a combination thereof for each of the at least one vehicle, based on the at least one piece of image data;
- searching for, by the controller, a user vehicle among the at least one vehicle, based on at least one of the at least one piece of image data, the 2D data, the 3D data, the user vehicle information, or a combination thereof, wherein the at least one piece of image data includes second image data for each of the at least one vehicle, obtained using a second camera included the sensor device; and
- identifying, by the controller, a temperature of each of the at least one vehicle included in the second image data, using a first search device including a temperature-based determiner.

17. The autonomous driving control method of claim 16, wherein the sensor device includes a first camera, and wherein the obtaining of the at least one piece of image data using the sensor device by the controller includes obtaining, by the controller, first image data for each of the at least one vehicle using the first camera.

18. The autonomous driving control method of claim 17, wherein the first camera includes a red-green-blue (RGB) camera, and wherein the second camera includes an infrared (IR) camera.

19. The autonomous driving control method of claim 17, wherein the detecting of the at least one of the 2D data, the 3D data, or the combination thereof for each of the at least one vehicle based on the at least one piece of image data by the controller includes:
- obtaining, by the controller, at least one of the 2D data, the 3D data, or a combination thereof for each of the at least one vehicle, based on the first image data; and
- searching for, by the controller, a bounding box with a specified temperature or more, based on at least one of the 2D data, the 3D data, the second image data, or a combination thereof, using the first search device including the temperature-based determiner.

20. The autonomous driving control method of claim 19, wherein the searching of the user vehicle among the at least one vehicle based on the at least one of the at least one piece of image data, the 2D data, the 3D data, the user vehicle information, or the combination thereof by the controller includes:
- controlling, by the controller, the mobile device to move adjacent to a vehicle corresponding to the bounding box identified as having the specified temperature or more;
- obtaining, by the controller, vehicle information of the vehicle corresponding to the bounding box, based on the first image data; and
- searching for, by the controller, the user vehicle based on whether the vehicle information is identical to the user vehicle information, using a second search device including a vehicle type recognizer and a vehicle number recognizer.

* * * * *